(12) United States Patent
Woo et al.

(10) Patent No.: US 7,103,449 B2
(45) Date of Patent: Sep. 5, 2006

(54) POSITION INFORMATION RECOGNITION APPARATUS FOR CLEANING ROBOT

(75) Inventors: Chun-Kyu Woo, Incheon (KR); Hyeong-Sin Jeon, Anyang (KR)

(73) Assignee: LG Electronics Inc., Seoul (KR)

( * ) Notice: Subject to any disclaimer, the term of this patent is extended or adjusted under 35 U.S.C. 154(b) by 160 days.

(21) Appl. No.: 10/606,213

(22) Filed: Jun. 26, 2003

(65) Prior Publication Data

US 2004/0199301 A1 Oct. 7, 2004

(30) Foreign Application Priority Data

Jan. 23, 2003 (KR) .................. 10-2003-0004573

(51) Int. Cl.
*G05B 19/04* (2006.01)
*G05B 19/18* (2006.01)

(52) U.S. Cl. .................. 700/251; 700/245; 701/1; 318/568.1

(58) Field of Classification Search ............... 700/245, 700/258, 251; 318/568.1, 568.12, 568.16, 318/568.17; 701/23, 26, 1; 15/49.1, 319; 342/127; 250/559.33; 901/47, 49

See application file for complete search history.

(56) References Cited

U.S. PATENT DOCUMENTS

| 5,400,244 | A | 3/1995 | Watanabe et al. |
| 5,440,216 | A | 8/1995 | Kim |
| 5,621,291 | A | 4/1997 | Lee |
| 5,652,489 | A | 7/1997 | Kawakami |
| 5,687,294 | A | 11/1997 | Jeong |
| 5,758,298 | A | 5/1998 | Guldner |
| 6,459,955 | B1 * | 10/2002 | Bartsch et al. ............ 700/245 |
| 6,496,754 | B1 * | 12/2002 | Song et al. ............... 700/245 |
| 6,496,755 | B1 * | 12/2002 | Wallach et al. .......... 700/245 |
| 6,580,246 | B1 * | 6/2003 | Jacobs ................. 318/568.16 |
| 6,594,844 | B1 * | 7/2003 | Jones ........................ 15/49.1 |
| 6,611,120 | B1 * | 8/2003 | Song et al. ........... 318/568.12 |
| 6,883,201 | B1 * | 4/2005 | Jones et al. ................ 15/319 |
| 2002/0153855 | A1 * | 10/2002 | Song et al. ........... 318/568.12 |
| 2003/0229421 | A1 * | 12/2003 | Chmura et al. ............ 700/245 |
| 2004/0020000 | A1 * | 2/2004 | Jones ........................ 15/319 |
| 2004/0049877 | A1 * | 3/2004 | Jones et al. ................. 15/319 |
| 2004/0111184 | A1 * | 6/2004 | Chiappetta et al. ......... 700/245 |
| 2004/0187249 | A1 * | 9/2004 | Jones et al. ................. 15/319 |
| 2004/0193339 | A1 * | 9/2004 | Hulden ........................ 701/23 |

FOREIGN PATENT DOCUMENTS

| DE | 3741259 | 6/1989 |
| JP | 5-143155 | 6/1993 |
| JP | 7-271435 | 10/1995 |

* cited by examiner

*Primary Examiner*—Richard Camby
*Assistant Examiner*—McDieunel Marc
(74) *Attorney, Agent, or Firm*—Greenblum & Bernstein, P.L.C.

(57) ABSTRACT

A position information recognition apparatus for a cleaning robot includes a fixed plate installed to a body of the cleaner and a motor fixedly secured to the fixed plate to generate a rotational force. A rotational cylinder having a rotational axis coincident with the axis of the motor is provided so as to rotate about a predetermined angle and a plurality of position information sensors are installed on the rotational cylinder at predetermined angular spacing in order to sense the surroundings. By installing several supersonic wave sensors that can rotate left and right over a predetermined range, the observation region can be greatly increased.

15 Claims, 6 Drawing Sheets

POSITION INFORMATION RECOGNITION APPARATUS FOR CLEANING ROBOT

BACKGROUND OF THE INVENTION

1. Field of the Invention

The present invention relates to a position information recognition apparatus for a cleaning robot, and in particular to a position information recognition apparatus for a cleaning robot capable of observing surroundings of a cleaning robot as 360° by rotating sensors as a certain angle.

2. Description of the Prior Art

In general, an automatic moving cleaner (hereinafter, it is referred to a cleaning robot) performs cleaning while moving of itself, when a charger is discharged, it moves to a charge position of itself, performs charging, after the charging, goes back to a cleaning position and performs cleaning again.

In order to perform cleaning and charging while moving cleaning regions thoroughly, the conventional cleaning robot includes a cleaner main body 1 having a fan motor, a suction pipe and a filter, etc.; plural driving wheels 2 rotatively installed at left and right sides of the bottom surface of the cleaner main body 1 and moving the cleaner main body 1; and each supersonic waves sensor 3 fixedly installed at the outer circumference of the cleaner main body 2 at regular intervals and sensing surroundings.

In each supersonic waves sensor 3, a pair of a transmitter 3A and a receiver 3B is fixedly installed at the front/rear or left/right at an angle of 90°, or in case of needs, several pairs of them are installed along the circumferential direction at regular intervals. In addition, the sensor having a sensing range of ±30° is mainly used in consideration of an appropriate sensitivity.

In addition, as depicted in FIG. 2, while the cleaner main body 1 moves in the rotational direction of the driving wheels 2, the transmitter 3A of each supersonic waves sensor 3 fixed at the outer circumference of the cleaner main body 1 generates supersonic waves, the receiver 3B senses reflected-returned supersonic waves, the supersonic waves sensor 3 recognizes a position and surroundings of the cleaner main body 1 and determines a proceeding direction or a proceeding distance, etc. of the cleaner main body 1.

However, as described-above, in the conventional cleaning robot, because a sensor having a sensing range of about ±30° is mainly used as the supersonic waves sensor 3 in consideration of an appropriate sensitivity, when four supersonic waves sensors 3 are installed at the cleaner main body 1, a sensing range is merely 240°, and accordingly it is impossible to observe around the cleaner thoroughly. In order to observe surroundings of the cleaner thoroughly, at least six supersonic waves sensors 3 have to be installed, in that case, because still there is an adjacent region out of the sensing range between the supersonic waves sensors 3 as shown in FIG. 2, more supersonic waves sensors 3 are required.

In addition, when the cleaning robot moves horizontally along the wall surface, because there is a region out of the sensing region between the supersonic waves sensors 3, the cleaner main body 1 moves while rotating at a certain angle, and accordingly unnecessary rotational movement is required.

SUMMARY OF THE INVENTION

In order to solve the above-mentioned problem, it is an object of the present invention to provide a position information recognition apparatus for a cleaning robot capable of observing surroundings of a cleaner thoroughly by using the small-number of supersonic waves sensors.

In addition, it is another object of the present invention to provide a position information recognition apparatus for a cleaning robot capable of moving horizontally along a wall surface without rotating a cleaner main body.

In order to achieve the above-mentioned objects, a position information recognition apparatus for a cleaning robot in accordance with the present invention includes a fixed plate installed at a cleaner main body; a main motor fixedly installed at the fixed plate in order to generate a rotational force; a rotational cylinder combined with a rotational axis of the main motor so as to be rotated at a certain angle; and plural position information sensors installed at the rotational cylinder at a certain angle in order to sense surroundings.

Other objects, characteristics and advantages of the present invention will become clear through detailed descriptions with reference to accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Hereinafter, the preferred embodiment of the present invention will be described with reference to accompanying drawings.

Figure 1:
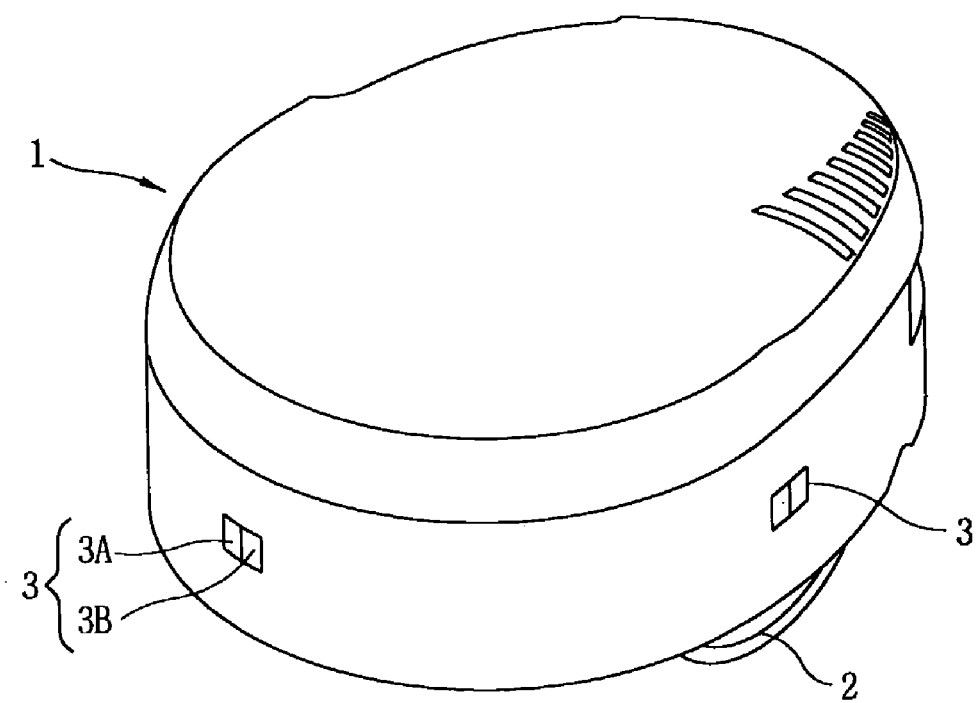
FIG. 1 is an external perspective view illustrating an example of a cleaning robot in accordance with the conventional art.
Figure 2:
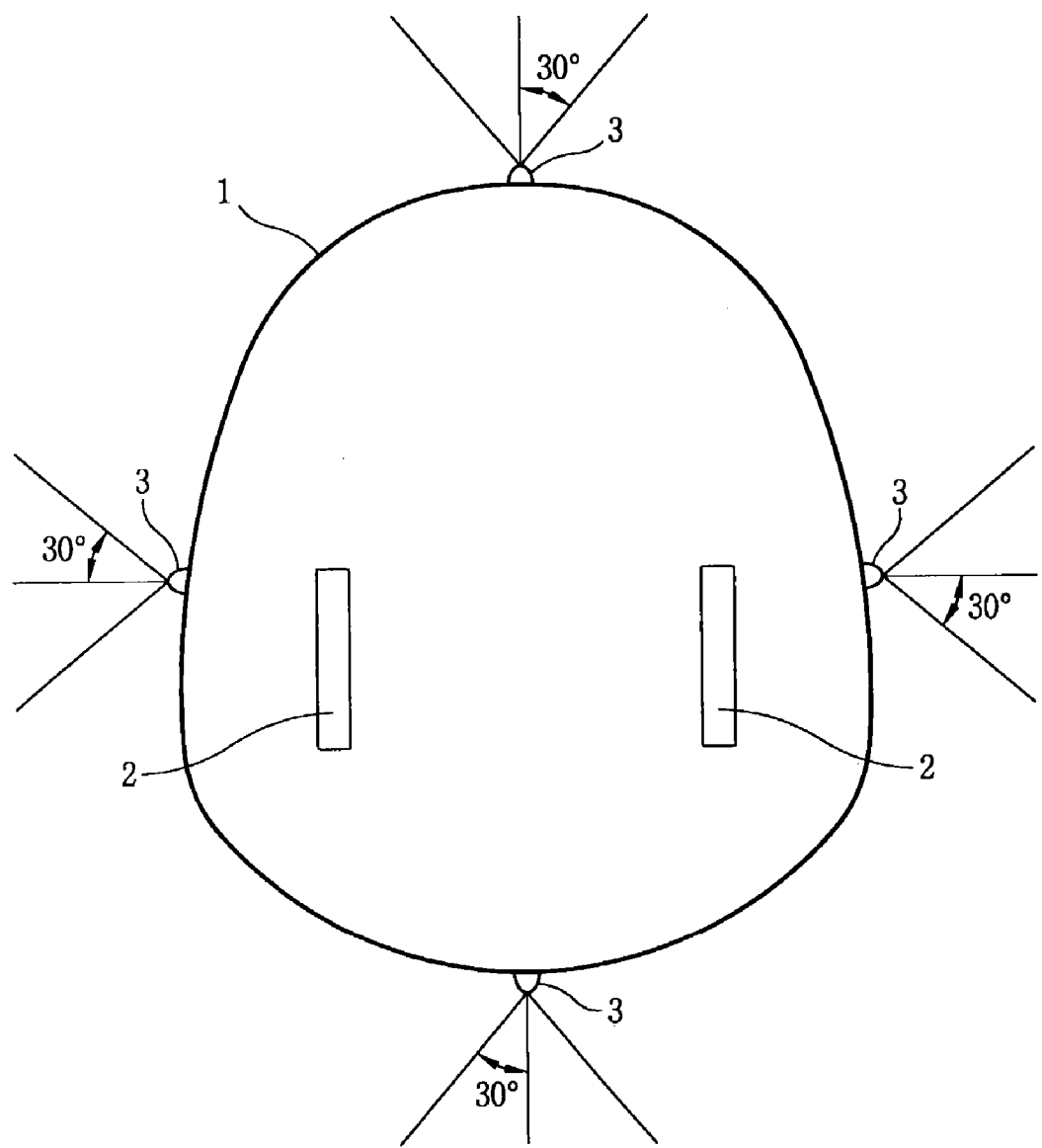
FIG. 2 is a plan view illustrating a position information recognition apparatus of a cleaning robot in accordance with the conventional art.
Figure 3:
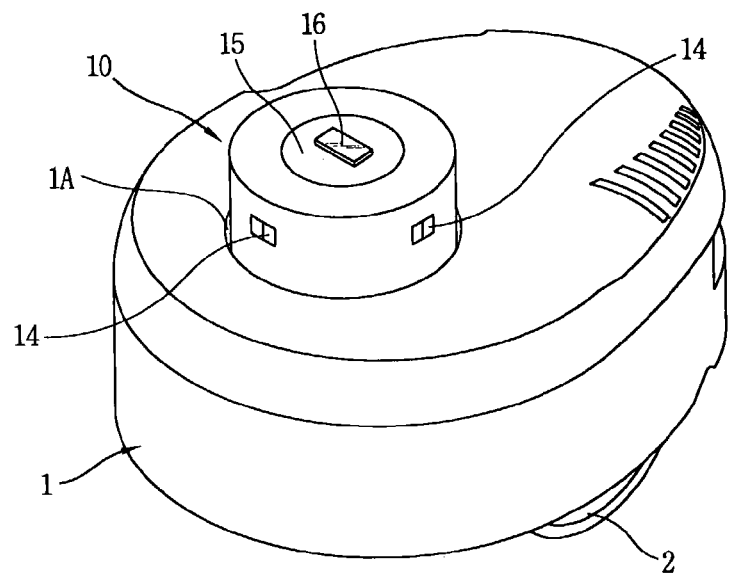
FIG. 3 is an external perspective view illustrating an example of a cleaning robot in accordance with the present invention.
Figure 4:
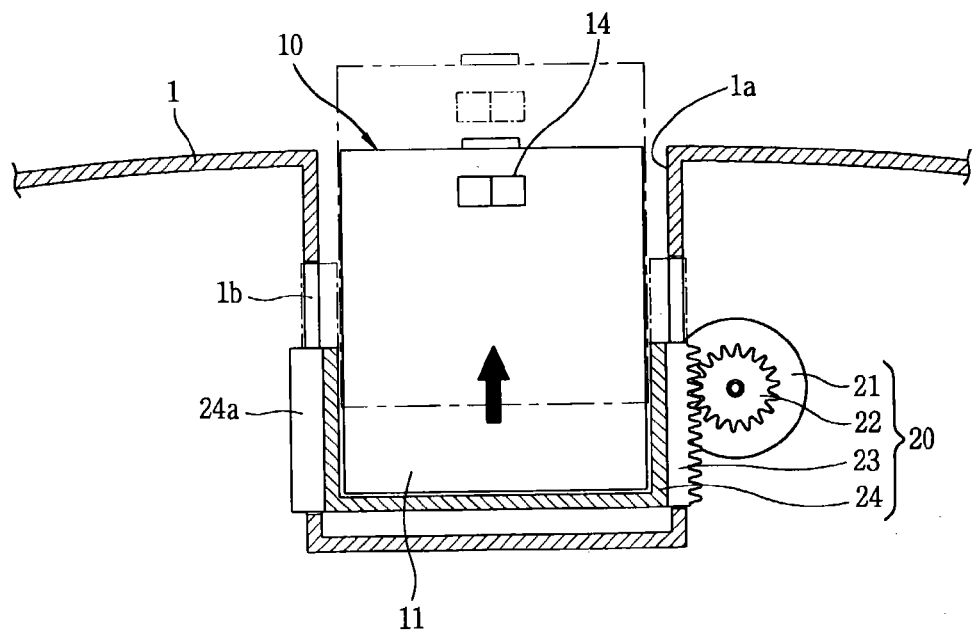
FIG. 4 is a vertical-sectional view illustrating a sensor hiding unit for moving up and down a sensor assembly in accordance with the present invention.
Figure 5:
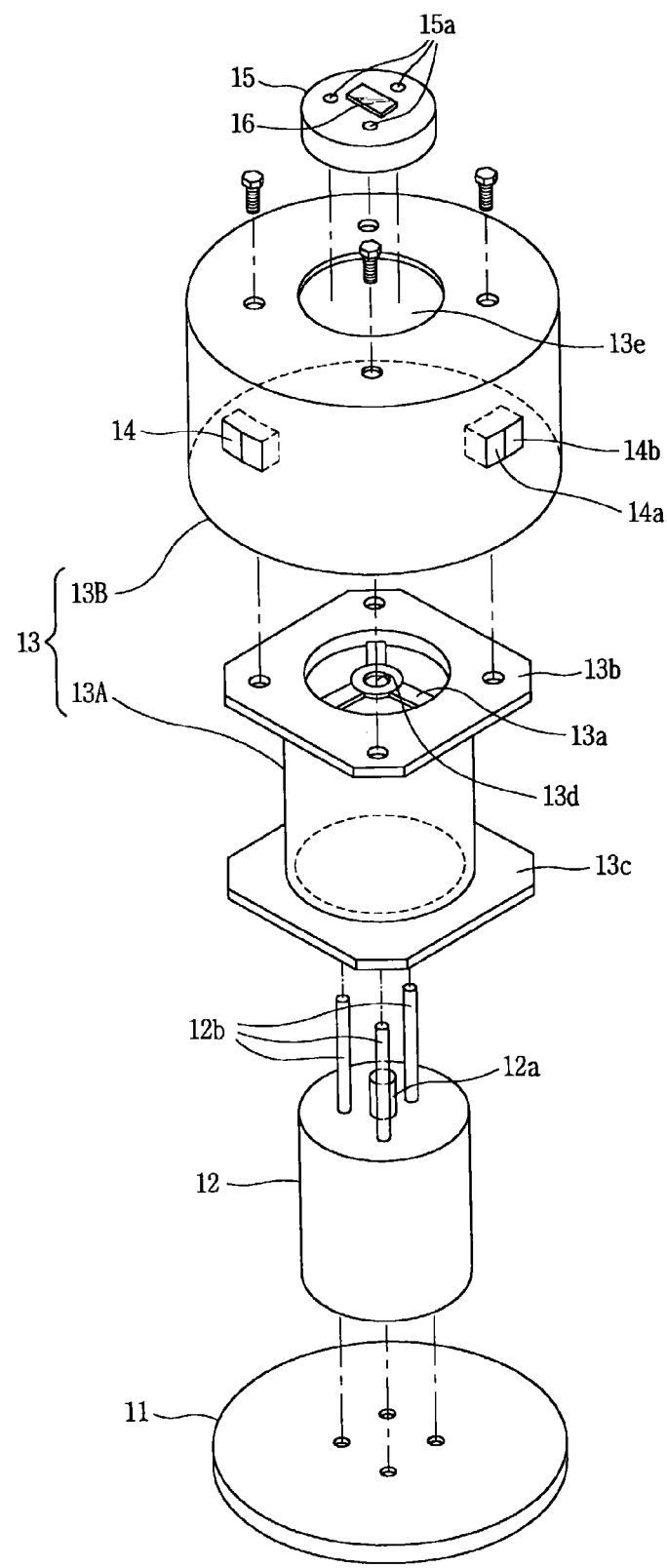
FIG. 5 is an exploded-perspective view illustrating a position recognition apparatus in accordance with the present invention.
Figure 6:
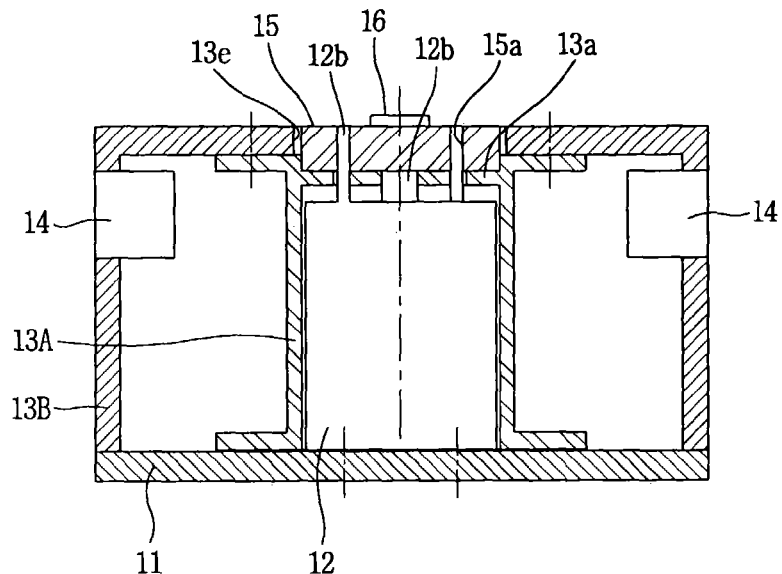
FIG. 6 is a vertical-sectional view illustrating a position information recognition apparatus for a cleaning robot in accordance with the present invention.

FIG. 3 is an external perspective view illustrating an example of a cleaning robot in accordance with the present invention, FIG. 4 is a vertical-sectional view illustrating a sensor hiding unit for moving up and down a sensor assembly in accordance with the present invention, FIG. 5 is an exploded-perspective view illustrating a position recognition apparatus for a cleaning robot in accordance with the present invention, and FIG. 6 is a vertical-sectional view illustrating a position information recognition apparatus for the cleaning robot in accordance with the present invention.

As depicted in FIGS. 3~6, the cleansing robot in accordance with the present invention includes a cleaner main body 1 including a fan, a motor, a suction pipe and a filter, etc.; plural driving wheels 2 rotatively installed at left and right bottom surfaces of the cleaner main body 1 and moving the cleaner main body 1 and a sensor assembly 10 rotatively installed at the cleaner main body 1 and observing the circumstances.

In the cleaner main body 1, a sensor assembly receiving portion 1A is caved in so as to have a certain depth or is pierced in order to hide the sensor assembly 10. In addition, a sensor hiding unit 20 is formed at a side of the sensor assembly receiving portion 1A in order to move the sensor assembly 10 up and down by being combined with a fixed plate 11 of the sensor assembly 10.

As depicted in FIG. 4, the sensor hiding unit includes a two-way rotational motor 21; a pinion 22 combined with a rotational axis of the two-way rotational motor 21 so as to be rotated two-way; a rack 23 combined with the pinion 22 and linearly moved up and down according to the rotational direction of the pinion 22; and a sensor supporting plate 24 combined with the rack 23 as one body and combined with the fixed plate 11 of the sensor assembly 10. In addition, at least two guide protrusions 24A are formed at the side surface of the sensor supporting plate 24, and it is preferable to form a long guide groove 1B at the side wall of the sensor assembly receiving unit 1A in the length direction so as to be corresponded to the guide protrusions 24A.

And, the sensor hiding unit 20 can be constructed as a general pulley by using a motor and a rope.

As depicted in FIGS. 5 and 6, the sensor assembly 10 includes a fixed plate 11 installed at the cleaner main body 1; a main motor 12 fixedly installed at the fixed plate 11 and generating a rotational force; a rotational cylinder 13 combined with a rotational axis 12a of the main motor 12 and rotating together with it; and plural (four in FIGS. 5 and 6) position information sensors 14 installed in the circumferential direction at a certain angle to the rotational cylinder 13 and sensing the surroundings.

The fixed plate 11 has a disc shape, and the main motor 12 is fastened-fixed to the central portion thereof by a screw. In addition, the fixed plate 11 fixes the sensor supporting plate 24 as a part of the sensor hiding unit 20 by fastening a screw.

The main motor 12 is a two-way rotational motor performable forward and backward rotations, a rotational angle of the main motor 12 can be variously controlled according to the number of the position information sensors 14 and an appropriate sensing angle. In more detail, in the general supersonic sensor, an appropriate sensing angle is ±30°, when the number of the supersonic sensors is four, a rotational angle of the main motor 12 is controlled as ±45°, and it is preferable to perform an omnidirectional sensing. In addition, at the top surface of the main motor 12, a guide plate supporting protrusion 12b is projected-formed at approximately three points centering around the rotational axis 12A so as to support the rotation guide plate 15.

The rotational cylinder 13 includes an inner cylinder 13A rotatively mounted on the top surface of the fixed plate 11, inserted into the outer circumference of the main motor 12 and having an electromotive protrusion 13a at the top inner circumference of the rotational cylinder 13 so as to be combined with the rotational axis 12a of the main motor 12; and an outer cylinder 13B combined with the top end of the inner cylinder 13A so as to be rotated together with and having the position information sensors 14 formed at the outer circumference at regular intervals.

The inner cylinder 13A has a cylindrical shape having the open top and bottom surfaces, and it is preferable to form flange portions 13b, 13c respectively at the lower outer circumference for the stable rotation and at the upper outer circumference for strong combination with the outer cylinder 13B. In addition, the electromotive protrusion 13a has three legs, and a fixing hole 13d is formed at the center of the three legs so as to be combined with the rotational axis 12A of the electromotive motor 12.

The outer cylinder 13B has the open bottom and the closed top surface as a cap sahpe, and a guide plate insertion hole 13e is formed at the center of the top surface so as to receive the rotation guide plate 15.

The position information sensor 14 as a supersonic waves sensor is installed at the outer cylinder 13B of the rotational cylinder 13 at an angle of about 90° so as to have an appropriate sensitivity angle of about ±30°. Herein, it is also possible to form the supersonic waves sensor at the outer circumference of the inner cylinder 13A and form a supersonic waves through hole (not shown) at the outer cylinder 13B.

The rotation guide plate 14 has a diameter insertable into the top end of the inner cylinder 13A of the rotational cylinder 13 with a certain interval, a thickness of the rotation guide plate 15 is obtained by adding a length mounted on the electromotive protrusion 13a of the inner cylinder 13A to a thickness of the outer cylinder 13B. In addition, it is preferable for the outer circumference of the rotation guide plate 14 to have a size slide-contacted to the guide plate insertion hole 13e of the outer cylinder 13B. In addition, a supporting hole 15a is formed at the central portion of the rotation guide plate 15 so as to receive the guide plate supporting protrusion 12b of the main motor 12.

Non-described reference numeral 14a is a transmitter of the position information sensor 14, 14b is a receiver of the position information sensor 14, and 16 is a display.

The operation of the position information recognition apparatus for the cleaning robot in accordance with the present invention will be described.

First, when a user presses an operational button, power of a charging battery (not shown) is applied to a fan motor (not shown), and a suction force is generated while the fan motor operates. Simultaneously, the driving wheels 2 are rotated according to a command of a control unit (not shown) and moves the cleaner main body 1 to a cleaning position, and accordingly the automatic cleaning process is performed.

In addition, when the control unit of the cleaner judges a charge level of the charging battery is lower at a certain level by checking it at any time, it rotates the driving wheels 2 in the forward or backward direction by adjusting a proceeding direction of the cleaner, and accordingly the cleaner main body 1 approaches a position at which a charger (not shown) is located.

Herein, in order to judge a cleaning position of the cleaner main body 1 or a charging position, the position information sensor 14 observes surroundings thoroughly, recognizes position information about surroundings and the charger and stores that in a microcomputer (not shown) in real time.

The operation will be described in more detail.

Figure 7:
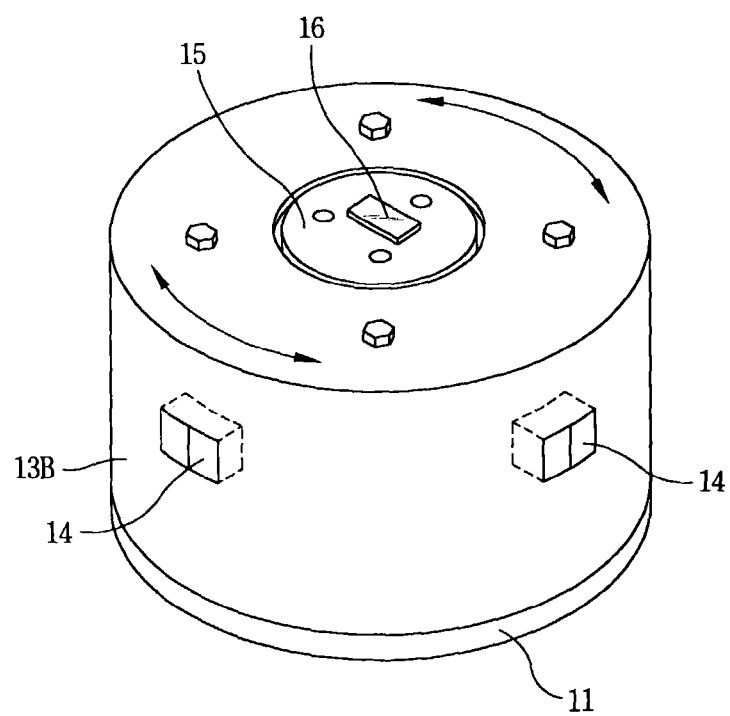
FIG. 7 is a perspective view illustrating usage state of a position information recognition apparatus for the cleaning robot in accordance with the present invention.

As depicted in FIGS. 4 and 7, when the two-way rotational motor 21 combined with the pinion 22 is rotated, the fixed plate 11 of the sensor assembly 10 combined with the rack 23 is moved upwardly, and the sensor assembly 10 is ascended.

Afterward, when the position information sensor 14 is exposed out of the sensor receiving portion 1a of the cleaner main body 1, the main motor 12 is rotated.

Figure 8:
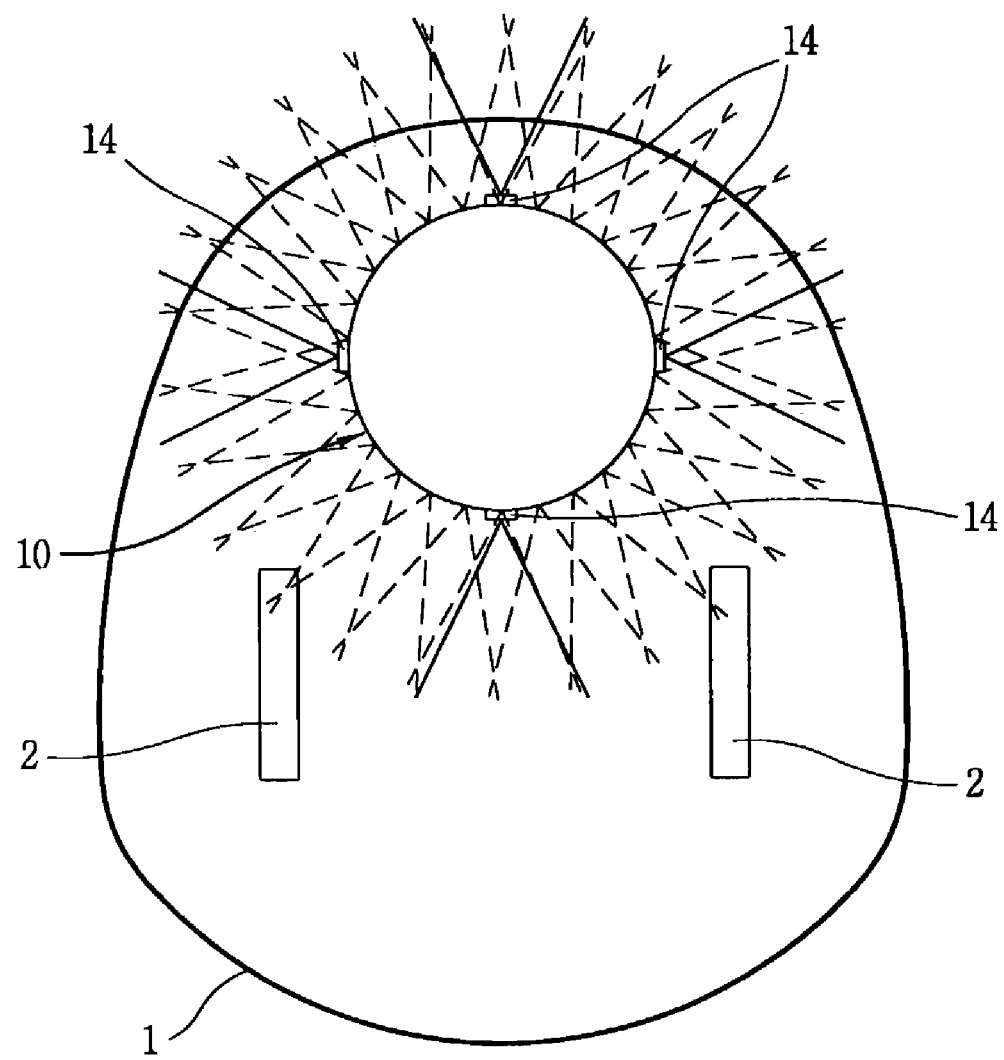
FIG. 8 is a plan view illustrating a position information recognition apparatus for the cleansing robot in accordance with the present invention.

FIG. 8 is a plan view schematically illustrating the position information recognition apparatus for the cleaning robot, when the main motor 12 is rotated, the rotational cylinder 13 performs the left-right rotation at an angle of ±45°. Simultaneously, the transmitter 14a of each position information sensor 14 installed at the outer cylinder 13B of the rotational cylinder 13 at an angle of 90° oscillates a certain sound wave, the receiver 14b receives the sound wave reflected from surrounded things, and each position information sensor 14 recognizes accurate position information. Herein, as described above, each position information sensor 14 is installed so as to have an intermediate angle of about 90° with an appropriate sensitivity angle as ±30°, rotates left/right at an angle of about ±45°, and accordingly the it can observe surroundings of the cleaning robot thoroughly as 360°.

Accordingly, in comparison with the conventional art, when the same-number of the supersonic waves sensors are installed in the present invention, much wider observation region can be obtained, and accordingly it is possible to obtain position information about surroundings and the charger more efficiently and accurately.

In addition, when the cleaning robot moves along the wall surface, because the sensor assembly rotates-moves horizontally while maintaining a distance from the wall surface, the cleaner main body can perform only moving without performing additional rotational motion, and accordingly input loss can be reduced.

In addition, by arranging the rotation guide plate at the top central portion of the sensor assembly and mounting the display for displaying various information inputted from the microcomputer, it is possible to grasp easily various information sensed by the sensor, namely, information about an operational state of the cleaner or various circumstances.

In addition, in the sensor assembly, by combining the rotational cylinder directly with the rotational axis of the main motor, backlash phenomenon is reduced in the operation, and accordingly a motor efficiency can be improved.

As described above, in the position information recognition apparatus for the cleaning robot in accordance with the present invention, by installing several supersonic waves sensors at regular intervals so as to rotate left/right, observation regions of the sensors are greatly increased in comparison with the conventional art, unnecessary rotational motion of the cleaner main body can be prevented in position recognition and distance compensation, and accordingly efficiency of cleaning can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A position information recognition apparatus for a cleaning robot, comprising:
   a fixed plate installed in a cleaner body;
   a motor fixedly installed to the fixed plate and configured to generate a rotational force;
   a rotational cylinder having a rotational axis coaxial with an output shaft of the motor, the rotational cylinder configured to rotate through a predetermined angle;
   a plurality of position information sensors installed to the rotational cylinder at a predetermined angular spacing to sense the surroundings of the cleaning robot; and
   a mover configured to move the rotational cylinder up and down between retracted and elevated positions.

2. The position information recognition apparatus according to claim 1, wherein the fixed plate has a disk-like shape and the lower end of the motor is connected to a central portion of the fixed plate.

3. The position information recognition apparatus according to claim 1, wherein the fixed plate includes a sensor mover for raising the position information sensors to a predetermined height so as to be exposed outside of the cleaner body in an operational state and for recessing the position information sensors into the cleaner body in a non-operational state.

4. The position information recognition apparatus according to claim 1, wherein the motor comprises a bi-directional motor that rotates forward and backward over a predetermined angular interval.

5. The position information recognition apparatus according to claim 4, wherein the motor has a rotational movement angle of ±45°.

6. The position information recognition apparatus according to claim 4, wherein the motor has a guide plate supporting protrusion provided at a plurality of locations at the top surface of the motor and centered about the output shaft of the motor.

7. The position information recognition apparatus according to claim 1, wherein the plural position information sensors are installed at the outer surface of the rotational cylinder at intervals of 90°.

8. The position information recognition apparatus according to claim 1, wherein the rotational cylinder has a guide plate insertion hole at a top portion configured to receive a rotation guide plate secured to the motor.

9. The position information recognition apparatus according to claim 8, further comprising an external display mounted at a top surface of the guide plate and configured to display information at least about an operational state of the cleaning robot.

10. The position information recognition apparatus according to claim 1, wherein the mover comprises:
    a bi-directional motor having an output shaft;
    a pinion mounted coaxially with the output shaft of the bi-directional motor, the pinion being bi-directionally rotatable;
    a rack engaged with the pinion and being linearly moveable upwardly and downwardly in accordance with a rotation direction of the pinion; and
    a sensor supporting plate secured to the pinion and connected to the fixed plate.

11. The position information recognition apparatus according to claim 1, wherein the rotational cylinder comprises:
    an inner cylinder rotatably mounted on a top portion of the fixed plate, the inner cylinder being configured to extend about the outer surface of the motor and having an electromotive protrusion at the upper inner surface of the rotational cylinder so as to be secured to the output shaft of the motor; and
    an outer cylinder secured to the upper end of the inner cylinder so as to be rotated together with the inner cylinder, the outer cylinder having the plurality of position information sensors mounted at the outer surface of the outer cylinder at uniform intervals.

12. The position information recognition apparatus according to claim 11, wherein the inner cylinder has a cylindrical shape with an open top and bottom, a flange portion, provided at the lower end, extends circumferentially outwardly to rotate the rotational cylinder and a flange portion, provided at an upper end, is secured to the outer cylinder.

13. The position information recognition apparatus according to claim 11, wherein the outer cylinder has an open bottom and a closed top and includes an insertion hole provided at a central top portion so as to receive a rotation guide plate.

14. A body of a cleaning robot comprising:
   a sensor assembly mounted for rotation at a top surface of the cleaner body to observe surroundings;
   a sensor assembly receiving portion provided in the body so as to receive the sensor assembly; and
   a sensor mover provided adjacent the sensor assembly receiving portion and configured to move the sensor assembly between exposed and retracted positions, wherein the sensor mover comprises:
   a bi-directional motor having an output shaft;
   a pinion mounted on the output shaft of the bi-directional motor, the pinion being bi-directionally rotatable;
   a rack engaged with the pinion and being linearly moveable upwardly and downwardly in accordance with a rotational direction of the pinion; and
   a sensor supporting plate secured for movement integrally with the rack and secured to a mounting plate of the sensor assembly.

15. The body of the cleaning robot according to claim 14, wherein the sensor supporting plate includes at least two guide protrusions at a side surface and an elongated guide groove at a sidewall of the sensor assembly receiving portion in alignment with the guide protrusions.

* * * * *